United States Patent
Koshikawa et al.

(10) Patent No.: US 7,681,283 B2
(45) Date of Patent: Mar. 23, 2010

(54) HINGE ASSEMBLY

(75) Inventors: Shinichirou Koshikawa, Yokaichiba (JP); Katsuya Imai, Tako-Machi (JP); Hisashi Fukai, Sanmu (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 78 days.

(21) Appl. No.: 11/995,496

(22) PCT Filed: Jul. 10, 2006

(86) PCT No.: PCT/JP2006/313670

§ 371 (c)(1),
(2), (4) Date: Jan. 11, 2008

(87) PCT Pub. No.: WO2007/007705

PCT Pub. Date: Jan. 18, 2007

(65) Prior Publication Data

US 2009/0139056 A1    Jun. 4, 2009

(30) Foreign Application Priority Data

Jul. 12, 2005    (JP) .............................. 2005-202852

(51) Int. Cl.
*E05F 1/08* (2006.01)
(52) U.S. Cl. .............................. 16/303; 16/330; 16/334
(58) Field of Classification Search ............... 16/303, 16/330, 334, 341, 342, 374, 375, 275, 276, 16/297; 379/433.13; 455/575.3; 361/679.27; 248/919–923
See application file for complete search history.

(56) References Cited

U.S. PATENT DOCUMENTS 6,704,418 B1    3/2004    Koshikawa
(Continued)

FOREIGN PATENT DOCUMENTS

JP    2001-152728    6/2001
(Continued)

OTHER PUBLICATIONS

International Search Report (English only) for PCT/JP2006/313670 mailed Sep. 19, 2006 (1 page).
(Continued)

*Primary Examiner*—William L. Miller
(74) *Attorney, Agent, or Firm*—Osha • Liang LLP

(57) ABSTRACT

A hinge assembly comprising a movable member 5 and a fixed member 6 rotatably connected to each other and a coiled spring (not shown) biasing the movable member 5 toward the fixed member 6. A receiving recess 11 is formed in an opposing surface 5b of the movable member 5 facing the fixed member 6. A spherical body 8 is received in the receiving recess 11 such that the spherical body 8 is movable in a circumferential direction of the movable member 5. A first cam portion 13a is formed in an opposing surface of the fixed member 6 facing the movable member 5. Rotation of the movable member 5 in a direction of an arrow causes the cam portion 13a to be abutted against the spherical body 8. The cam portion 13a converts a biasing force of the coiled spring into a rotational biasing force. The rotational biasing force causes the spherical body 8 to be rapidly abutted against a first hitting portion 11a of the receiving recess 11 and thereby to generate a clicking sound.

6 Claims, 10 Drawing Sheets

U.S. PATENT DOCUMENTS

| | | | |
|---|---|---|---|
| 6,832,411 B2 * | 12/2004 | Koshikawa et al. | 16/330 |
| 6,990,711 B2 * | 1/2006 | Koshikawa et al. | 16/334 |
| 7,047,599 B2 * | 5/2006 | Oshima et al. | 16/337 |
| 7,251,859 B2 * | 8/2007 | Oshima et al. | 16/330 |
| 7,386,918 B2 * | 6/2008 | Tomizawa | 16/303 |
| 7,484,271 B2 * | 2/2009 | Oshima et al. | 16/366 |
| 2002/0069482 A1 | 6/2002 | Oshima et al. | |
| 2003/0009851 A1 * | 1/2003 | Oshima et al. | 16/334 |
| 2003/0056325 A1 | 3/2003 | Koshikawa et al. | |
| 2005/0032559 A1 | 2/2005 | Sudo et al. | |

FOREIGN PATENT DOCUMENTS

| | | |
|---|---|---|
| JP | 2002-181031 | 6/2002 |
| JP | 2002-242925 | 8/2002 |
| JP | 2003-120655 | 4/2003 |
| JP | 2003-239945 | 8/2003 |
| JP | 2003239944 A * | 8/2003 |

OTHER PUBLICATIONS

Patent Abstracts of Japan 2002-242925 dated Aug. 28, 2002 (1 page).
Patent Abstracts of Japan 2003-120655 dated Apr. 23, 2003 (1 page).
Patent Abstracts of Japan 2003-239945 dated Aug. 27, 2003 (1 page).
Patent Abstracts of Japan 2001-152728 dated Jun. 5, 2001 (1 page).
Patent Abstracts of Japan 2002-181031 dated Jun. 26, 2002 (1 page).

* cited by examiner

HINGE ASSEMBLY

TECHNICAL FIELD

This invention relates to a hinge assembly that generates a clicking sound.

BACKGROUND ART

A hinge assembly of this type typically includes a fixed member, a movable member connected to the fixed member such that the movable member is rotatable and movable toward and away from the fixed member and a coiled spring biasing the movable member toward the fixed member. A pair of spherical bodies are provided on an opposing surface of the movable member facing the fixed member and a pair of cam surfaces are provided on an opposing surface of the fixed member facing the movable member. The pair of spherical bodies and the pair of cam surfaces respectively abut against one another when the movable member is in a predetermined rotational angle range with respect to the fixed member. The spherical bodies and the cam surfaces in respective abutment with one another convert a biasing force of the coiled spring into a rotational biasing force. The rotational biasing force causes the movable member to be rotated to a predetermined rotation position with respect to the fixed member and to be maintained at the rotation position.

The fixed member is adapted to be rotatable through a predetermined slight angle with respect to other members of the hinge assembly or tubular portions, etc., of a pair of housings rotatably connected by the hinge assembly, and when the movable member is in the predetermined rotational angle range, the fixed member is rotated through the predetermined slight angle by the rotational biasing force converted by the spherical bodies and the cam surfaces. As a result, hitting portions formed in the fixed member and in the other members or the tubular portions abut against each other at a high speed. This generates a clicking sound.

Patent Document 1 Japanese Unexamined Patent Application Publication No. 2001-152728.

Patent Document 2: Japanese Unexamined Patent Application Publication No. 2002-181031.

DISCLOSURE OF THE INVENTION

Problem to be Solved by the Invention

In the above mentioned conventional hinge assembly that generates a clicking sound, it is necessary to make the other members or the tubular portions rotatable with respect to the fixed member through the slight angle and form the hitting portions on both of the other members or the tubular portions and the fixed member. A hinge assembly that cannot generate a clicking sound cannot be made to generate a clicking sound by minor modifications such as a partial modification of design. Instead, it is necessary to make major design changes to the fixed member and the other members. This tends to result in a substantial increase in manufacturing cost.

Means for Solving the Problem

In order to solve the above-mentioned problem, the present invention provides a hinge assembly comprising a fixed member, a movable member connected to the fixed member such that the movable member is rotatable about a rotation axis and movable toward and away from the fixed member along the rotation axis, and biasing means biasing the movable member toward the fixed member. One of opposing surfaces of the fixed member and the movable member facing each other has an abutment member disposed therein, the abutment member being abutted against the other of the opposing surfaces by the biasing means. The other of the opposing surfaces has a first cam portion disposed therein, the first cam portion converting a biasing force of the biasing means into a first rotational biasing force by being abutted against the abutment member. The movable member is rotationally biased in a first circumferential direction by the first rotational biasing force via the abutment member. The hinge assembly is characterized in that the one of the opposing surfaces has a receiving recess formed therein; that the abutment member is received in the receiving recess such that the abutment member is movable in a circumferential direction about the rotation axis within a predetermined range; and that the receiving recess has a first hitting portion disposed in one end portion thereof in the first circumferential direction, the first hitting portion defining one of limit points of a movable range of the abutment member and generating a clicking sound by being abutted against the abutment member moved by the first rotational biasing force.

In this arrangement, it is preferable that two of the abutment members arranged symmetrically with respect to the rotation axis and two of the receiving recesses arranged symmetrically with respect to the rotation axis are provided and, correspondingly, two of the first cam portions are provided.

Preferably, the receiving recess has a second hitting portion disposed in the other end portion thereof in the circumferential direction about the rotation axis, the second hitting portion defining the other of the limit points of the movable range of the abutment member and generating a clicking sound by being abutted against the abutment member. Preferably, the other of the opposing surfaces has a second cam portion disposed therein, the second cam portion converting the biasing force of the biasing means into a second rotational biasing force by being abutted against the abutment member, the second rotational biasing force acting in the opposite direction from the first rotational biasing force, and the abutment member is abutted against the second hitting portion by the second rotational biasing force. In this case, it is preferable that two of the abutment members arranged symmetrically with respect to the rotation axis and two of the receiving recesses arranged symmetrically with respect to the rotation axis are provided and, correspondingly, two of the first cam portions and two of the second cam portions are provided.

Preferably, the one of the opposing surfaces has a projecting portion disposed fixedly thereon, the projecting portion projecting toward the other of the opposing surfaces. Preferably, the other of the opposing surfaces has a third cam portion disposed therein, the third cam portion converting the biasing force of the biasing means into a rotational biasing force by being abutted against the projecting portion, the rotational biasing force cooperating with the first rotational biasing force to cause the movable member to be rotated in the first circumferential direction. In this case, it is preferable that the receiving recess has a second hitting portion disposed in the other end portion thereof in the circumferential direction about the rotation axis, the second hitting portion defining the other of the limit points of the movable range of the abutment member and generating a clicking sound by being abutted against the abutment member; and that the other of the opposing surfaces has a second cam portion and a fourth cam portion disposed therein, the second cam portion converting the biasing force of the biasing means into a second rotational biasing force by being abutted against the abutment member, the second rotational biasing force acting in the opposite direction from the first rotational biasing force, the second rotational biasing force causing the abutment member to be abutted against the second hitting portion, the fourth cam portion converting the biasing force of the biasing means into a rotational biasing force by being abutted against the projecting portion, the rotational biasing force cooperating with the second rotational biasing force to cause the movable member to be rotated in the second circumferential direction.

EFFECT OF THE INVENTION

According to the present invention having the above-described construction, the biasing force of the biasing means is converted into the first rotational biasing force that acts in the first circumferential direction by the abutment of the abutment member against the first cam portion. The abutment member is moved in the first circumferential direction inside the receiving recess to abut against the hitting portion. This generates a clicking sound. Therefore, all that is required for generating the clicking sound is to form the receiving recess for movably receiving the abutment member in that one of the opposing surfaces of the fixed member and the movable member which is provided with the abutment member. In this way, the conventional hinge assembly that cannot generate a clicking sound can be easily modified to the hinge assembly that generates a clicking sound by minor design changes.

BRIEF DESCRIPTION OF DRAWINGS

FIG. 11(A) shows the relationship when the spherical body is in contact with an opposing surface of the fixed member; FIG. 11(B) shows the relationship when the spherical body is in contact with a second contact point; FIG. 11(C) shows the relationship when the spherical body is in abutment with a second hitting portion of the receiving recess; and FIG. 11(D) shows the relationship when the movable member is in a talking position.

FIG. 14(A) shows the relationship when a fixed spherical body is in contact with a second contact point; FIG. 14(B) shows the relationship when a movable spherical body is in contact with a second contact point; FIG. 14(C) shows the relationship when the movable spherical body is in abutment with a second hitting portion; and FIG. 14(D) shows the relationship when the movable member is in a talking position.

DESCRIPTION OF REFERENCE NUMERALS

Figure 1:
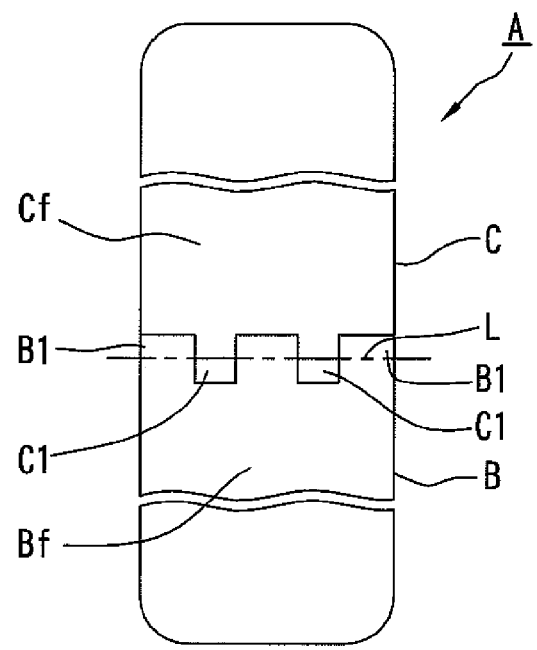
FIG. 1 is a partial plan view of a mobile phone handset in which a hinge assembly according to the present invention is used.

1 . . . hinge assembly
1' . . . hinge assembly
5 . . . movable member
5b . . . opposing surface
6 . . . fixed member
6b . . . opposing surface
7 . . . coiled spring (biasing means)
8 . . . spherical body (abutment member)
9 . . . spherical body (abutment member, projecting portion)
11 . . . receiving recess
11a . . . first hitting portion
11b . . . second hitting portion
12 . . . receiving recess
12a . . . first hitting portion
12b . . . second hitting portion
13a . . . first cam portion
13b . . . second cam portion (fourth cam portion)
14a . . . first cam portion (third cam portion)
14b . . . second cam portion

BEST MODE FOR CARRYING OUT THE INVENTION

Preferred embodiments of the present invention will now be described with reference to the accompanying drawings.

Figure 2:
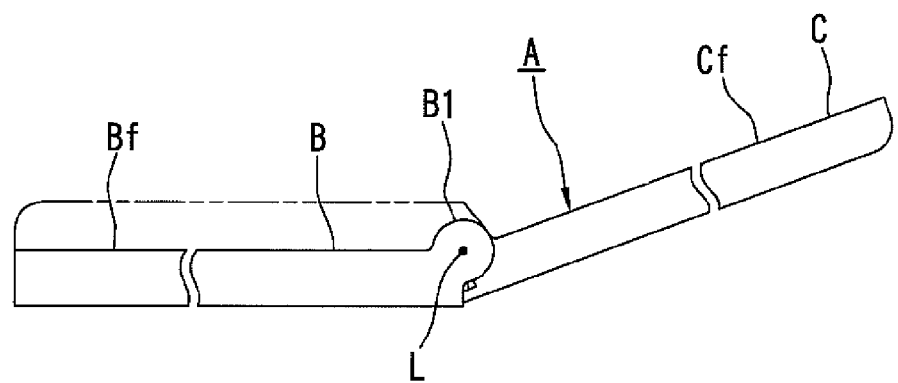
FIG. 2 is a side view of the above mobile phone handset.
Figure 3:
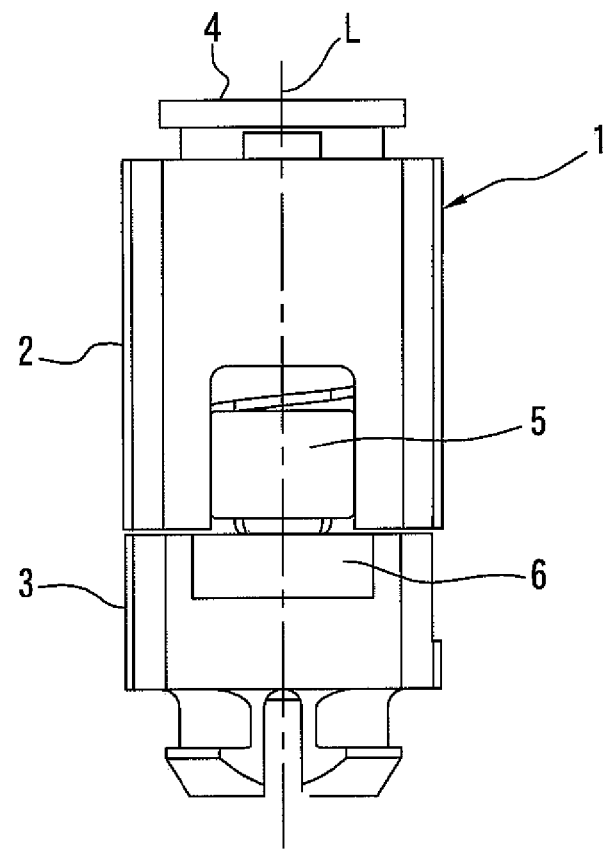
FIG. 3 is a front view of a first embodiment of the hinge assembly according to the present invention.
Figure 4:
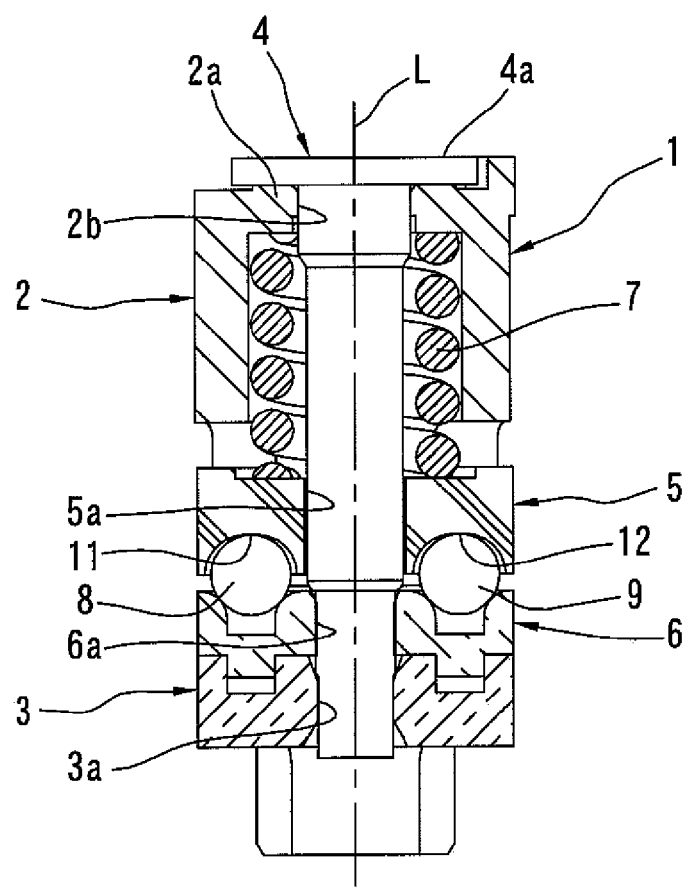
FIG. 4 is a front cross-sectional view of the first embodiment.
Figure 5:
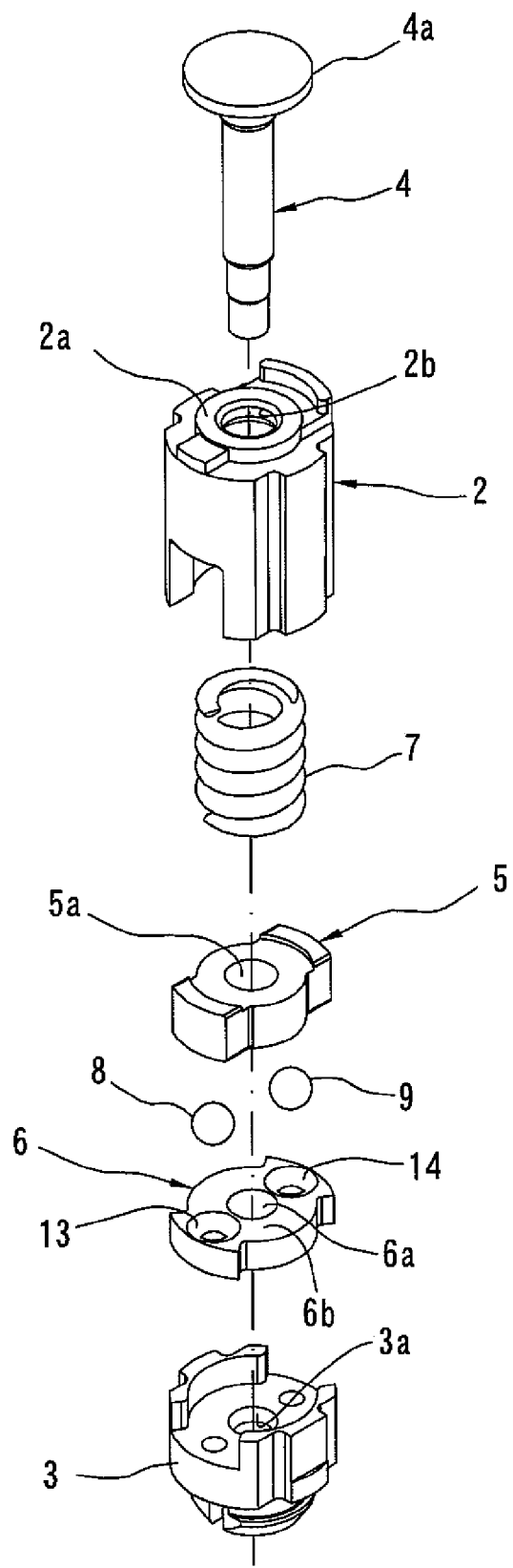
FIG. 5 is an exploded perspective view of the first embodiment.
Figure 6:
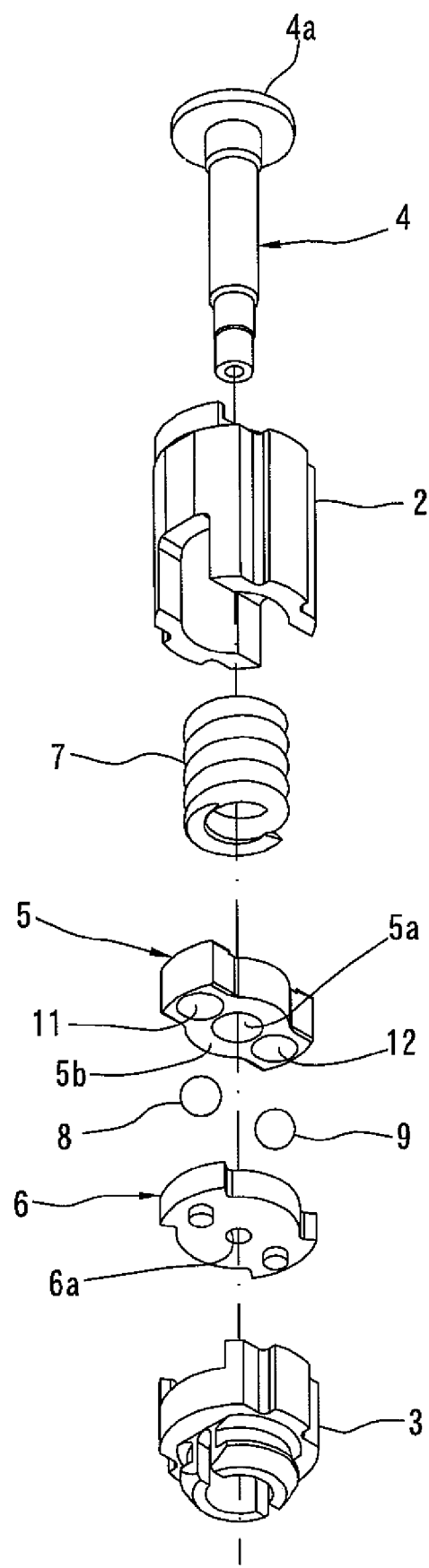
FIG. 6 is an exploded perspective view of the first embodiment viewed from a different direction from FIG. 5.
Figure 7:
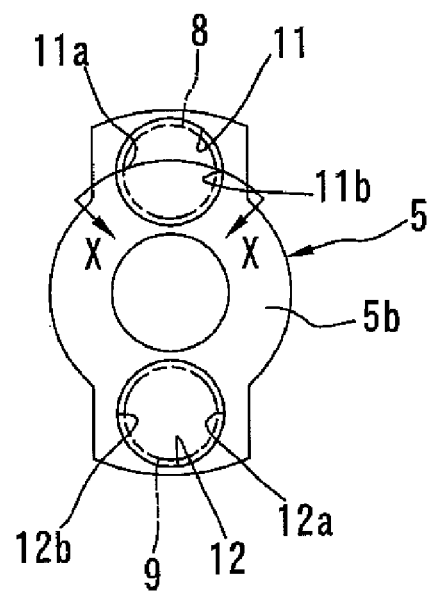
FIG. 7 is a plan view of a movable member used in the first embodiment.
Figure 8:
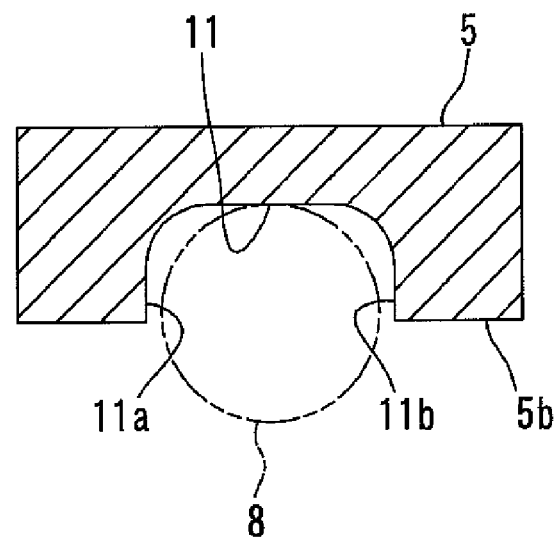
FIG. 8 is an enlarged cross-sectional view taken on line X-X of FIG. 7.
Figure 9:
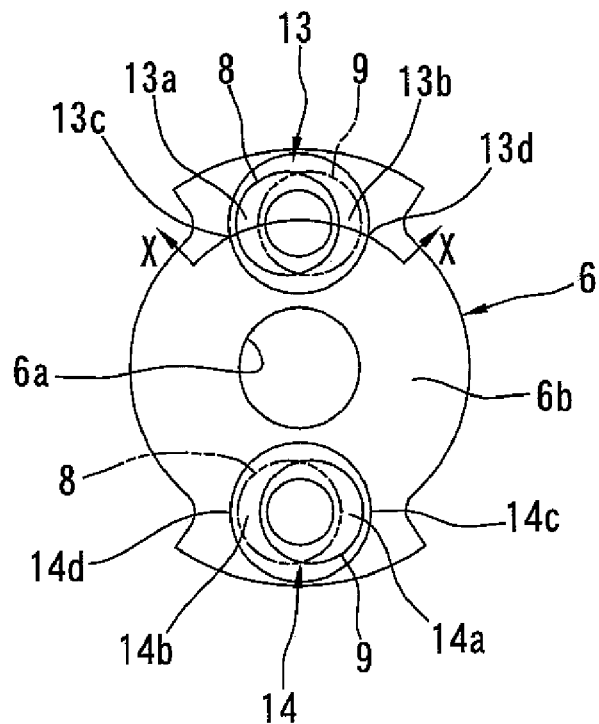
FIG. 9 is a plan view of a fixed member used in the first embodiment.
Figure 10:
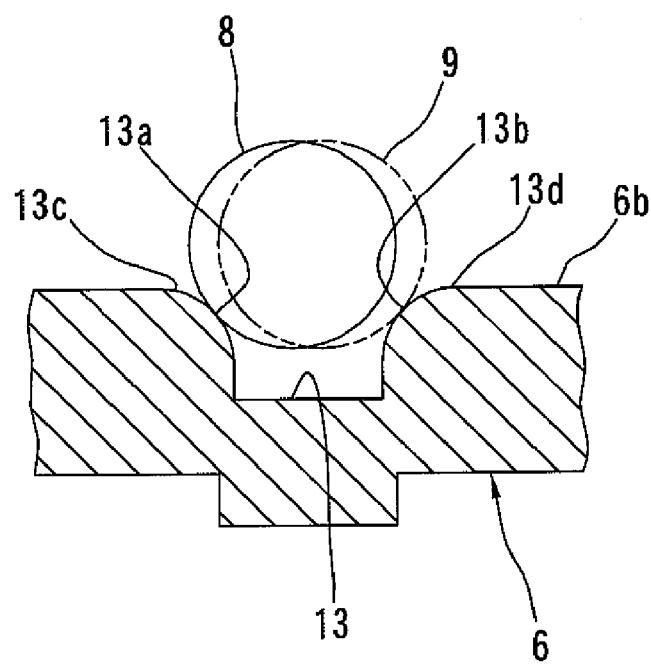
FIG. 10 is an enlarged cross-sectional view taken on line X-X of FIG. 9.

FIGS. 1 and 2 show a mobile phone handset A in which a hinge assembly according to the present invention is used. The mobile phone handset A includes a transmission section B and a reception section C. The transmission section B has a pair of connection cylindrical parts B1, B1 formed on one end portion thereof. The connection cylindrical parts B1, B1 are coaxially arranged and spaced from each other in an axial direction thereof. The reception section C has a pair of connection cylindrical parts C1, C1 formed on one end portion thereof. The connection cylindrical parts C1, C1 are coaxially arranged and spaced from each other in an axial direction thereof. Moreover, the connection cylindrical parts C1, C1 are coaxially aligned with the connection cylindrical parts B1, B1 and arranged between the cylindrical parts B1. Two of the connection cylindrical parts B1, C1 adjacent to each other and the other two of the connection cylindrical parts B1, C1 are each rotatably connected together by a hinge assembly 1, 1, which will be described later. As a result, the transmission section B and the reception section C are rotatably connected about a rotation axis L (axis of the connection cylindrical parts B1, C1). Although the transmission section B and the reception section C are rotatable with each other, for the sake of explanation, let us assume that the transmission section 13 is fixed in position and the reception section C is rotated with respect to the transmission section B. A range of rotation of the reception section C with respect to the transmission section B is restricted between a folded position represented by an imaginary line in FIG. 2 and a talking position away from the folded position by a predetermined angle (160 degrees, for example), which is represented by a solid line in FIG. 2. The folded position is defined by the abutment of a front surface Cf of the reception section C against a front surface Bf of the transmission section B. The talking position is defined by the abutment of end portions of the transmission section B and the reception section C adjacent to each other, which happens when the reception section C is rotated to the talking position. The rotation range of the reception section C may not be 160 degrees. It may be greater or smaller than 160 degrees.

The hinge assembly 1 according to the present invention for rotatably connecting the reception section C and the transmission section B will now be described. As shown in FIGS. 3 to 6, the hinge assembly 1 includes a first hinge member 2, a second hinge member 3 and a hinge pin 4. The first hinge member 2 is of a circular cylindrical shape being open at one end portion thereof and having a bottom part 2a in the other end portion thereof. A through hole 2b coaxial with the rotation axis L is formed in a central portion of the bottom part 2a. A basal end portion of the hinge pin 4 coaxial with the rotation axis L is rotatably fitted into the through hole 2b. A head part 4a is formed in the basal end portion of the hinge pin 4. Abutment of the head part 4a against the bottom part 2a prohibits the hinge pin 4 from moving further in a direction from the bottom part 2a toward an opening portion of the first hinge member 2. In other words, abutment of the bottom part 2a against the head part 4a prohibits the first hinge member 2 from escaping from the hinge pin 4 in a direction from the opening portion toward the bottom part of the first hinge member 2.

The second hinge member 3 is formed in a shape of a disk and arranged to face an end face of the opening portion of the first hinge member 2. A through hole 3a coaxial with the rotation axis L is formed in a central portion of the second hinge member 3. A distal end portion of the hinge pin 4 is fixedly fitted into the through hole 3a. As a result, the second hinge member 3 is rotatably connected to the first hinge member 2 via the hinge pin 4. Alternatively, the hinge pin 4 may be rotatably fitted into the through hole 3a of the second hinge member 3. In this case, the hinge pin 4 may be non-rotatably fitted into the through hole 2b of the first hinge member 2. The second hinge member 3 may be movable in a direction from the distal end portion toward the basal end portion of the hinge pin 4 as long as the second hinge member 3 is prohibited from moving further in a distal direction than a predetermined point in the distal end portion of the hinge pin 4.

The first hinge member 2 is fitted into the connection cylindrical part C1 of the reception section C. The second hinge member 3 is fitted into the connection cylindrical part B1 of the transmission section B. The first hinge member 2 and the second hinge member 3 are rotatably connected through the hinge pin 4. Therefore, the connection cylindrical parts B1, C1 are rotatably connected to each other via the first and second hinge members 2, 3 and the hinge pin 4 of the hinge assembly 1, and consequently, the transmission section B and the reception section C are rotatably connected to each other through the hinge assembly 1. The first hinge member 2 is non-rotatably fitted into the reception section C. Accordingly, the first hinge member 2 is rotated in unison with the reception section C. On the other hand, the second hinge member 3 is non-rotatably fitted into the transmission section B. Accordingly, the second hinge member 3 is fixed in position with the transmission section B.

An intermediate portion of the hinge pin 4 located between the first hinge member 2 and the second hinge member 3 of the hinge pin 4 passes through a movable member 5 and a fixed member 6. The movable member 5 is disposed nearer to the first hinge member 2 and the fixed member 6 is disposed nearer to the second hinge member 3.

The movable member 5 is formed in a shape of a disk. A through hole 5a coaxial with the rotation axis L is formed in a central portion of the movable member 5. The intermediate portion of the hinge pin 4 is rotatably and slidably fitted into the through hole 5a. Moreover, the movable member 5 is connected to an end portion on the opening portion side of the first hinge assembly 2 non-rotatably and movably in the direction of the rotation axis L. As a result, when the reception section C is rotated with respect to the transmission section B, the movable member 5 is rotated in unison with the reception section C and the first hinge member 2. Therefore, positions of the movable member 5 when the reception section C is in the folded position and in the talking position are respectively referred to as the folded position and the talking position.

A through hole 6a coaxial with the rotation axis L is formed in a central portion of the fixed member 6. The intermediate portion of the hinge pin 4 is rotatably and slidably fitted into the through hole 6a. Accordingly, the fixed member 6 is rotatable and movable with respect to the hinge pin 4. However, the fixed member 6 is non-rotatably connected to the second hinge member 3 and press-contacted with the second hinge member 3 by a coiled spring 7, which will be described later, and therefore, in effect, the fixed member 6 is non-rotatable and non-movable with respect to the hinge pin 4 and the second hinge member 3. Therefore, the fixed member 6 may be fixed to the hinge pin 4, or alternatively, the fixed member 6 may be formed integrally with the second hinge member 3. The fixed member 6 is non-rotatably connected to the second hinge member 3, and accordingly, is fixed in position with the transmission section B.

The coiled spring (biasing means) 7 is disposed between an outer peripheral surface of the hinge pin 4 and an inner peripheral surface of the first hinge member 2. One end portion of the coiled spring 7 is in abutment with the bottom part 2a of the first hinge member 2 and the other end portion of the coiled spring 7 is in abutment with the movable member 5. As a result, the coiled spring 7 biases the movable member 5 toward the fixed member 6 and presses the movable member 5 onto the fixed member 6 via a pair of spherical bodies 8, 9, which will be described later. Consequently, the fixed member 6 is pressed onto the second hinge member 3, and furthermore, the head part 4a of the hinge pin 4 is pressed onto the bottom part 2a of the first hinge member 2. Thus, the first hinge member 2, the second hinge member 3, the hinge pin 4, the movable member 5, the fixed member 6, the coiled spring 7 and the spherical bodies 8, 9 are formed as an inseparable unit.

As shown in FIG. 4 and FIGS. 6 to 8, a pair of receiving recesses 11, 12 are formed in an opposing surface 5b of the movable member 5 facing the fixed member 6. The pair of receiving recesses 11, 12 are arranged on the same circumference about the rotation axis L 180 degrees from each other in a circumferential direction. In other words, the pair of receiving recesses 11, 12 are arranged symmetrically about the rotation axis L. The pair of receiving recesses 11, 12 have the same dimensions and the same shape, which is circular when viewed from the direction of the rotation axis L. End portions on the opening side, i.e. nearer to the fixed member 6, of inner peripheral surfaces of the receiving recesses 11, 12 are formed as cylindrical surfaces extending parallel to the rotation axis L. One end portions of the cylindrical surfaces in the circumferential direction about the rotation axis L are first hitting portions 11a, 12a and the other end portions of the cylindrical surfaces in the circumferential direction about the rotation axis L are second hitting portions 11b, 12b.

The spherical bodies (abutment members) 8, 9 are respectively received in the receiving recesses 11, 12. The spherical bodies 8, 9 have the same dimensions. A diameter of the spherical bodies 8, 9 is smaller than an inner diameter on the opening side of the inner peripheral surfaces of the receiving recesses 11, 12. As a result, the spherical bodies 8, 9 are respectively movable (rollable) in the receiving recesses 11, 12 through a distance equal to a difference in diameter between the spherical bodies 8, 9 and the receiving recesses 11, 12 in the circumferential direction of the movable member 5 (circumferential direction about the rotation axis L). Travel limit points of the spherical bodies 8, 9 in a first circumferential direction are respectively defined by the abutment of the spherical bodies 8, 9 against the first hitting portions 11a, 12a and travel limit points of the spherical bodies 8, 9 in a second circumferential direction that is opposite to the first circumferential direction are respectively defined by the abutment of the spherical bodies 8, 9 against the second hitting portions 11b, 12b.

An outer diameter of the spherical bodies 8, 9 is designed to be generally twice as large as a depth of the receiving recesses 11, 12. Accordingly, generally half of the spherical bodies 8, 9 protrude from the receiving recesses 11, 12 toward the fixed member 6 and the spherical bodies 8, 9 are abutted against an opposing surface of the fixed member 6 facing the movable member 5. Portions of bottom surfaces of the receiving recesses 11, 12 to be contacted with the spherical bodies 8, 9 are formed as flat surfaces that are orthogonal to the rotation axis L so that the positions of the spherical bodies 8, 9 in the direction of the rotation axis L can be maintained constant, in other words, the amount of protrusion of the spherical bodies 8, 9 from the receiving recesses 11, 12 can be maintained constant, regardless of the positions of the spherical bodies 8, 9 in the receiving recesses 11, 12. End portions on the bottom portion side of the inner peripheral surfaces of the receiving recesses 11, 12 are spaced from the spherical bodies 8, 9 when the spherical bodies 8, 9 are in abutment with the first hitting portions 11a, 12a or the second hitting portions 11b, 12b. This feature is realized by forming the end portions on the bottom portion side of the inner peripheral surfaces of the receiving recesses 11, 12 as circular arcuate surfaces whose radius is smaller than a radius of the spherical bodies 8, 9.

When the spherical bodies 8, 9 move in the receiving recesses 11, 12 at a high speed and abut against the first hitting portions 11a, 12a or the second hitting portions 11b, 12b, an impact sound is generated. This is a clicking sound. In order to reliably generate the clicking sound and at the same time to prevent premature wearing of the spherical bodies 8, 9, the first hitting portions 11a, 12a and the second hitting portions 11b, 12b, it is desirable to make the spherical bodies 8, 9 and the movable member 5 out of metal such as steel.

As shown in FIGS. 4, 5, 9, and 10, a pair of engagement recesses 13, 14 are formed in an opposing surface 6b of the fixed member 6 facing the movable member 5. The pair of engagement recesses 13,14 have the same dimensions and the same shape, which is circular when viewed from the direction of the rotation axis L. End portions on the opening side, i.e. nearer to the movable member 5, of inner peripheral surfaces of the engagement recesses 13, 14 are formed as convex surfaces having generally quarter-circular cross-sections. One end portions of the convex surfaces of the engagement recesses 13, 14 in the circumferential direction of the fixed member 6 (circumferential direction about the rotation axis L) are first cam portions 13a, 14a and the other end portions of the convex surfaces in the circumferential direction are second cam portions 13b, 14b. The first cam portions 13a, 14a smoothly continue to the opposing surface 6b of the fixed member 6 at first contact points 13c, 14c and the second cam portions 13b, 14b smoothly continue to the opposing surface 6b of the fixed member 6 at second contact points 13d, 14d.

A pair of engagement recesses 13, 14 are arranged on the same circumference as the pair of receiving recesses 11, 12 180 degrees from each other in the circumferential direction. Moreover, the pair of engagement recesses 13, 14 are arranged such that when the movable member 5 is within a predetermined first rotational angle range in a circumferential direction about the rotation axis L, the spherical bodies 8, 9 are respectively pressed onto the first cam portions 13a, 14a by a biasing force of the coiled spring 7, and when the movable member 5 is in a predetermined second rotational angle range, which is away from the first rotational angle range by a predetermined angle in the circumferential direction, the spherical bodies 8, 9 are respectively pressed onto the second cam portions 14b, 13b by a biasing force of the coiled spring 7.

To be more specific, when the movable member 5 is rotated in a direction from the talking position toward the folded position (first circumferential direction) to reach a position located a predetermined angle (15 degrees, for example) before the folded position, the spherical bodies 8, 9 are respectively abutted against the first contact points 13c, 14c. The position of the movable member 5 (reception section C) at this point is hereinafter referred to as a first contact position. When the movable member 5 is rotated even slightly from the first contact position toward the folded position, the spherical bodies 8, 9 are abutted against the first cam portions 13a, 14a. Since the first cam portions 13a, 14a are inclined such that the distance between the first cam portions 13a, 14a and the opposing surface 6b increases along the circumference about the rotation axis L from the first contact points 13c, 14c to the centers of the engagement recesses 13, 14, when the spherical bodies 8, 9 are contacted with the first cam portions 13a, 14a, the biasing force of the coiled spring 7 is converted into a first rotational biasing force by the spherical bodies 8, 9 and the first cam portions 13a, 14a. The first rotational biasing force causes the spherical bodies 8, 9 to respectively move in the first and second receiving recesses 11, 12 in the direction from the talking position toward the folded position to be abutted against the first hitting portions 11a, 12a. Following the abutment of the spherical bodies 8, 9 against the first hitting portions 11a, 12a, the movable member 5 is rotationally biased by the first rotational biasing force via the spherical bodies 8, 9 in the same direction to be rotated up to the folded position. When the movable member 5 reaches the folded position, the spherical bodies 8, 9 are still in abutment with the first cam portions 13a, 14a. Accordingly, the front surface Cf of the reception section C is abutted against the front surface Bf of the transmission section B by the first rotational biasing force, and the reception section C and the movable member 5 are maintained at the folded position. The angle between the folded position and the first contact position is the first rotational angle range.

When the movable member 5 is rotated in a direction from the folded position toward the talking position (second circumferential direction), in a similar manner as when the movable member 5 is rotated in the direction from the talking position toward the folded position, the spherical bodies 8, 9 are respectively abutted against the second contact points 14d, 13d when the movable member 5 reaches a second contact position located a predetermined angle (15 degrees, for example) before the talking position. When the movable member 5 is rotated even slightly from the second contact position toward the talking position, the spherical bodies 8, 9 are respectively abutted against the second cam portions 14b, 13b and the biasing force of the coiled spring 7 is converted into a second rotational biasing force by the spherical bodies 8, 9 and the second cam portions 14b, 13b. The second rotational biasing force causes the spherical bodies 8, 9 to respectively move in the first and the second receiving recesses 11, 12 in a direction from the folded position toward the talking position to be respectively abutted against the second hitting portions 11b, 12b. Consequently, the movable member 5 is rotationally biased by the second rotational biasing force via the spherical bodies 8, 9 to be rotated up to the talking position. Then the movable member 5 and the reception section C are maintained at the talking position. The angle between the talking position and the second contact position is the second rotational angle range.

In the hinge assembly 1, it is possible for the spherical body 8 to be abutted against the first and second cam portions 13a, 13b at the same time and for the spherical body 9 to be abutted against the first and second cam portions 14a, 14b at the same time, and it is also possible for the spherical body 8 to be abutted against the first and second cam portions 14a, 14b at the same time and for the spherical body 9 to be abutted against the first and second cam portions 13a, 13b at the same time. However, these things can happen only before the hinge assembly 1 is built into the connection cylindrical parts B1, C1 of the mobile phone handset A. Neither of these things can happen once the hinge assembly 1 is built in the connection cylindrical parts B1, C1.

In the hinge assembly 1 having the above-described arrangement, let us assume that the movable member 5 (reception section C) is in the folded position. In this condition, the spherical bodies 8, 9 are respectively abutted against the first hitting portions 11a, 12a and at the same time against the first cam portions 13a, 14a. Accordingly, in order to rotate the movable member 5 from the folded position toward the talking position, the movable member 5 should be rotated against the first rotational biasing force. In a condition that the movable member 5 is away from the folded position but within the first rotational angle range, when the movable member 5 is left free to rotate, the movable member 5 is returned to the folded position by the first rotational biasing force. When the movable member 5 is away from the folded position beyond the first rotational angle range, the spherical bodies 8, 9 are contacted with the opposing surface 6b of the fixed member 6. Therefore, in order to rotate the movable member 5 beyond the first rotational angle range toward the talking position, the movable member 5 should be rotated against a frictional resistance to be generated between the spherical bodies 8, 9 and the opposing surface 6b. This frictional resistance causes the spherical bodies 8, 9 to be respectively pressed onto the first hitting portions 11a, 12a while the movable member 5 is moved from the folded position to the second contact position.

Figure 11:
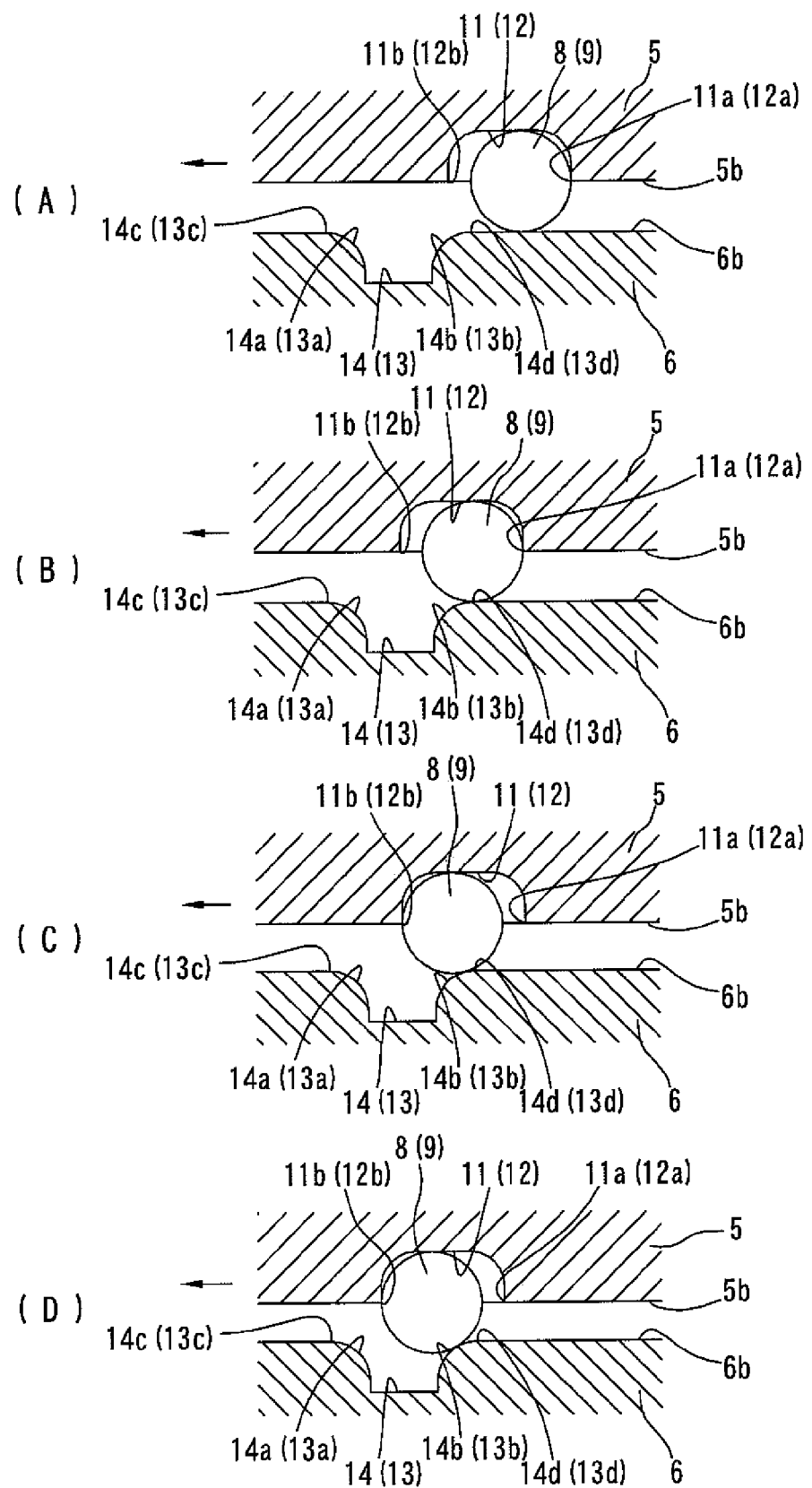
FIG. 11 shows the relationship among a receiving recess, a spherical body and an engagement recess in the first embodiment.

FIG. 11(A) shows the spherical bodies 8, 9 that have respectively reached near the second contact points 14d, 13d along with the rotation of the movable member 5 from the folded position toward the talking position. When the movable member 5 is further rotated toward the talking position (in a direction of arrow in FIG. 11), as shown in FIG. 11 (B), the spherical bodies 8, 9 are respectively contacted with the second contact points 14d, 13d. When the movable member 5 is further rotated to reach the second rotational angle range, the spherical bodies 8, 9 are respectively contacted with the second cam portions 14b, 13b. Then, the spherical bodies 8, 9 are rapidly moved toward the talking position with respect to the movable member 5 by the second rotational biasing force. As a result, as shown in FIG. 11 (C), the spherical bodies 8, 9 are respectively abutted against the second hitting portions 11b, 12b. This generates an impact sound, i.e. a clicking sound. Following the abutment of the spherical bodies 8, 9 against the second hitting portions 11b, 12b, the movable member 5 is rotated toward the talking position by the second rotational biasing force via the spherical bodies 8, 9. Consequently, the movable member 5 reaches the talking position and stops there. When the movable member 5 reaches the talking position, as shown in FIG. 11 (D), the spherical bodies 8, 9 are respectively in abutment with the second cam portions 14b, 13b. Accordingly, the movable member 5 is maintained at the talking position by the second rotational biasing force. As is obvious from the fact that the spherical bodies 8, 9 are in abutment with the second cam portions 14b, 13b not only while the spherical bodies 8, 9 move from the first hitting portions 11a, 12a to the second hitting portions 11b, 12b, but also after the movable member 5 reaches the talking position, the length of the second cam portions 14b, 13b in the direction of the rotation axis L is designed to be longer than a movable distance of the spherical bodies 8, 9 in the first and second receiving recesses 11, 12, i.e. distance between the first hitting portion 11a (12a) and the second hitting portion 11b (12b) in the circumferential direction about the rotation axis L.

In order to rotate the movable member 5 in the talking position up to the folded position, the movable member 5 should be rotated against the second rotational biasing force when the movable member 5 is in the second rotational angle range. This is because the spherical bodies 8, 9 are respectively in abutment with the second hitting portions 11b, 12b and the second cam portions 14b, 13b. When the movable member 5 is left free to rotate within the second rotational angle range, the movable member 5 is returned to the talking position by the second rotational biasing force. When the movable member 5 is rotated beyond the second rotational angle range, the spherical bodies 8, 9 contact the opposing surface 6b of the fixed member 6. Accordingly, beyond the second rotational angle range, the movable member 5 should be rotated toward the folded position against the frictional resistance generated between the spherical bodies 8, 9 and the bottom surfaces of the first and second receiving recesses 11, 12, or the frictional resistance generated between the spherical bodies 8, 9 and the opposing surface 6b. This frictional resistance keeps the spherical bodies 8, 9 in abutment with the second hitting portions 11b, 12b from beyond the second rotational angle range until they reach the first contact points 13c, 14c.

After the spherical bodies 8, 9 reach and contact the first contact points 13c, 14c, when the movable member 5 is further rotated toward the folded position, the spherical bodies 8, 9 are abutted against the first cam portions 13a, 14a. As a result, the first rotational biasing force works on the spherical bodies 8, 9, causing the spherical bodies 8, 9 to be rapidly moved toward the folded position with respect to the movable member 5 and to be respectively abutted against the first hitting portions 11a, 12a. This generates an impact sound, i.e. a clicking sound. After the abutment of the spherical bodies 8, 9 against the first hitting portions 11a, 12a, the movable member 5 is rotated toward the folded position by the first rotational biasing force via the spherical bodies 8, 9. Consequently, the movable member 5 reaches the folded position, stops there, and is maintained there. As is obvious from the fact that the spherical bodies 8, 9 are in abutment with the first cam portions 13a, 14a not only while the spherical bodies 8, 9 are moved from the second hitting portions 11b, 12b to the first hitting portions 11a, 12a, but also after the movable member 5 reaches the folded position, the length of the first cam portions 13a, 14a in the direction of the rotation axis L is designed to be longer than a movable distance of the spherical bodies 8, 9 in the first and second receiving recesses 11, 12.

As mentioned above, in the hinge assembly 1, the spherical bodies 8, 9 are respectively received in the first and second receiving recesses 11, 12 such that the spherical bodies 8, 9 are movable in the circumferential direction about the rotation axis L, and no special member is required for generating the clicking sound. Especially, a conventional hinge assembly in which a pair of spherical bodies are respectively non-movably received in a pair of recesses formed in the movable member 5 can be easily converted into the hinge assembly 1 according to the present invention, by minor design changes in which the pair of recesses are changed into the first and second receiving recesses 11, 12. This involves no major design changes, and thus the hinge assembly 1 can be manufactured with a low cost.

Figure 12:
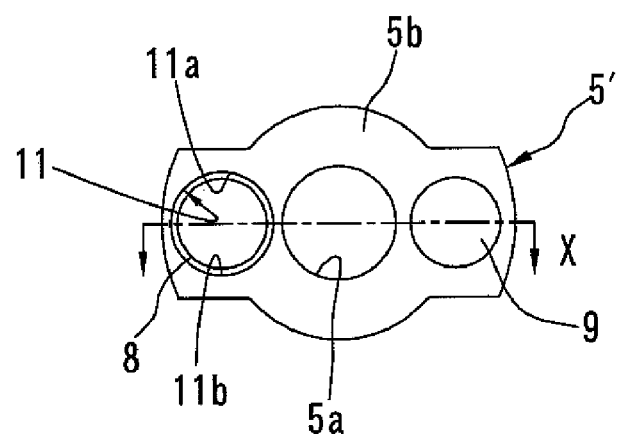
FIG. 12 is a plan view of a movable member used in a second embodiment of the present invention.
Figure 13:
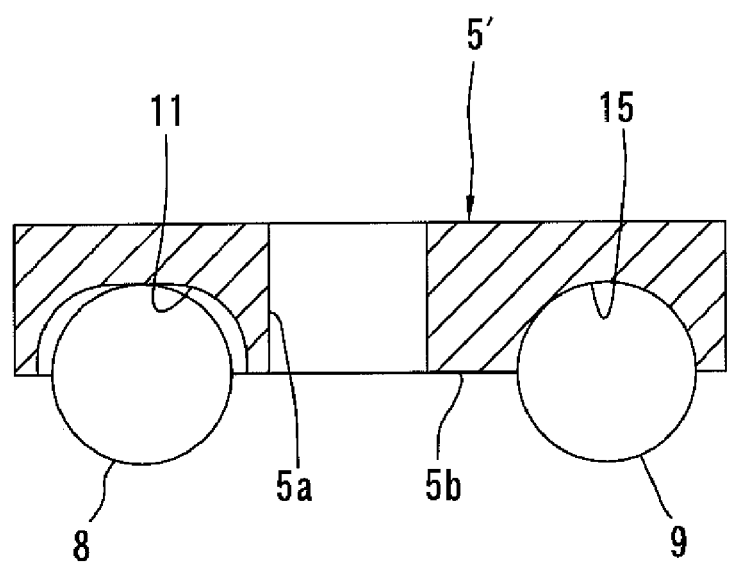
FIG. 13 is an enlarged cross-sectional view taken on line X-X of FIG. 12.

FIGS. 12 and 13 show a movable member 5' and the pair of the spherical bodies 8, 9 in a second embodiment of the present invention. In the movable member 5' of the second embodiment, a support recess 15, in place of the second receiving recess 12, is formed in the opposing surface 5b facing the fixed member 6. The support recess 15 and the first receiving recess 11 are disposed on the same circumference about the rotation axis L 180 degrees away from each other. In other words, the support recess 15 is arranged such that the center of the support recess 15 is symmetric to the center of the first receiving recess 11 with respect to the first rotation axis L. The spherical body 9 is held in the support recess 15 fixed in position. In other respects, the hinge assembly in the second embodiment is of the same construction as in the first embodiment.

Figure 14:
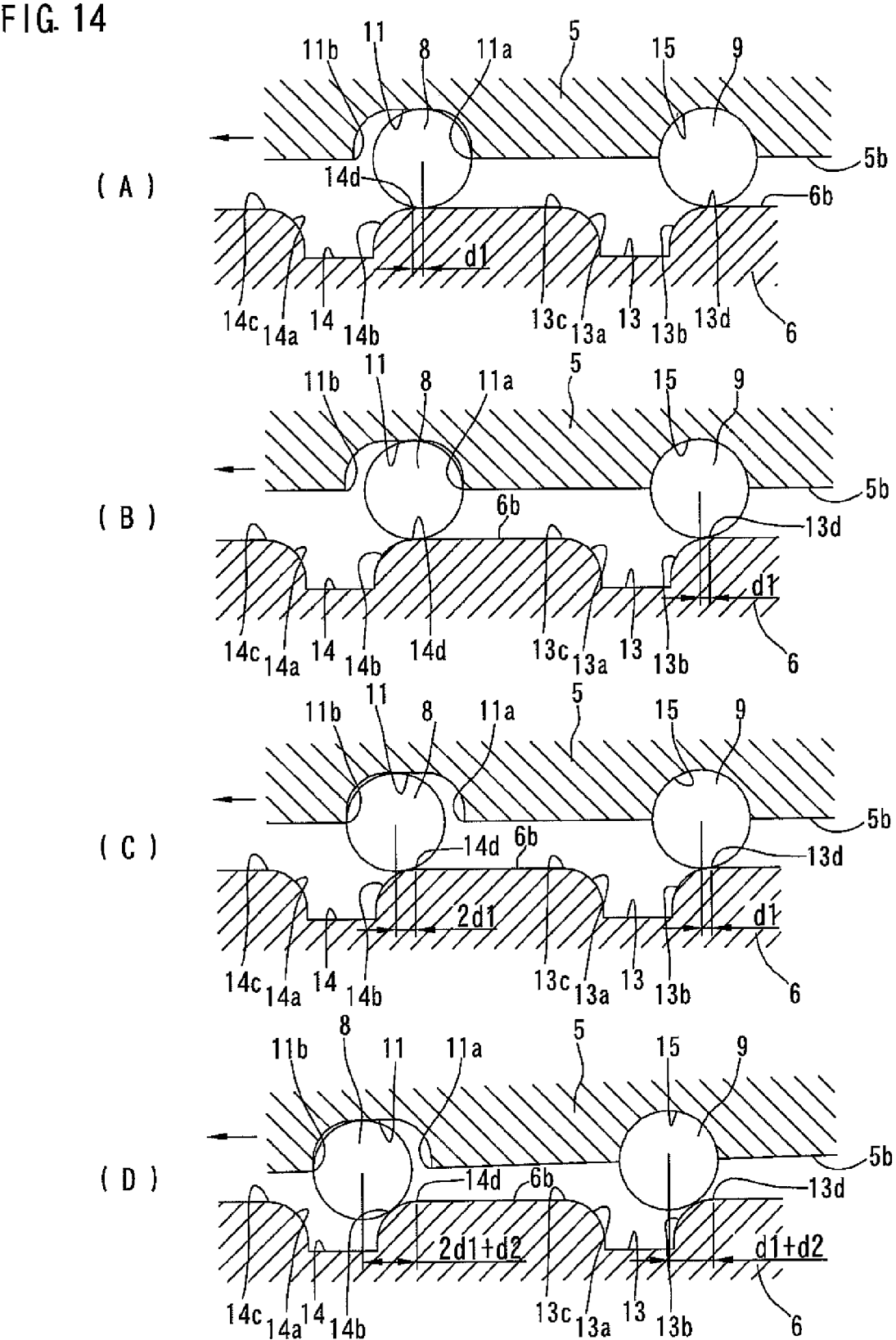
FIG. 14 shows the relationship among a pair of receiving recesses, a pair of spherical bodies and a pair of engagement recesses in the second embodiment.

In the hinge assembly having the above-described arrangement, let us assume that the movable member 5 has been rotated from the folded position toward the talking position, and as shown in FIG. 14(A), the spherical body 9 is in abutment with the second contact point 13d. At this time, the spherical body 8 is in abutment with the first hitting portion 11a. The center of the spherical body 8 is away from the center of the receiving recess 11 in the circumferential direction about the rotation axis L by a distance d1 that is half as long as the movable distance of the spherical body 8 in the first receiving recess 11. Accordingly, the spherical body 8 is positioned at a point located the distance d1 before the second contact point 14d. When the movable member 5 is rotated even slightly from that position toward the talking position, the spherical body 9 is abutted against the second cam portion 13b. Consequently, the biasing force of the coiled spring 7 is converted into a fourth rotational biasing force by the spherical body 9 and the second cam portion 13b. The fourth rotational biasing force causes the spherical boy 9 to move in the direction from the folded position toward the talking position (second circumferential direction). As is obvious from the above, in the hinge assembly, the second cam portion 13b is used as a fourth cam portion.

When the movable member 5 is rotated toward the talking position by the fourth rotational biasing force, the spherical body 8 is moved toward the talking position in response thereto. When the spherical body 8 is moved through the distance d1 from the position shown in FIG. 14(A) toward the talking position, as shown in FIG. 14(B), the spherical body 8 contacts the second contact point 14d. When the movable member 5 is further rotated toward the talking position and the spherical body 8 is abutted against the second cam portion 14b, the spherical body 8 is rapidly moved through a distance 2d1 toward the talking position with respect to the movable member 5 by the second rotational biasing force. Then, as shown in FIG. 14(C), the spherical body 8 is abutted against the second hitting portion 11b. This generates a clicking sound. After the abutment of the spherical body 8 against the second hitting portion 11b, the movable member 5 is rotated through a predetermined distance d2 to reach the talking position, and maintained at the talking position by the second rotational biasing force and the fourth rotational biasing force.

When the movable member 5 is in the talking position, the spherical body 9 is at a position a distance (d1+d2) away from the second contact point 13d, while the spherical body 8 is at a position a distance (2d1+d2) away from the second contact point 14d. Thus, the spherical body 8 has moved further than the spherical body 9 by the distance d1. Moreover, since the second cam portions 13b, 14b are each formed with the convex circular arc surface that protrudes outwardly, the spherical body 8 is positioned forward of the spherical body 9 in a direction from the movable member 5 toward the fixed member 6. Accordingly, the movable member 5 is inclined such that the distance between the movable member 5 and the fixed member 6 is greater at the spherical body 9 side and smaller at the spherical body 8 side. Therefore, the hinge assembly of this embodiment should be designed such that the movable member 5 can be inclined with respect to the rotation axis L. However, the amount of inclination of the movable member 5 is so small as to be produced, for example, by difference in dimension required for making the hinge pin 4 rotatable in the through hole 5a, i.e. difference between an inner diameter of the through hole 5a and an outer diameter of the hinge pin 4. Therefore, it is not required to adopt a special design for making the movable member 5 inclinable. In a condition shown in FIG. 14(B), the movable member 5 is inclined such that the distance between the movable member 5 and the fixed member 6 is greater at the spherical body 8 side and smaller at the spherical body 9 side. In a condition shown in FIG. 14(C), the movable member 5 is inclined such that the distance between the movable member 5 and the fixed member 6 is greater at the spherical body 9 side and smaller at the spherical body 8 side. In either condition, the amount of inclination is smaller than the amount of inclination in the condition shown in FIG. 14(D).

When the movable member 5 is rotated from the taking position toward the folded position, the movable member 5 is rotated toward the folded position against the second rotational biasing force and the forth rotational biasing force. When the movable member 5 is rotated through a distance (d1+d2) from the talking position in the circumferential direction, the spherical body 9 escapes the second cam portion 13b. Accordingly, after this point, the movable member 5 is to be rotated against the second rotational biasing force. When the movable member 5 is further rotated through the distance d1, the spherical body 8 escapes the second cam portion 14b. Accordingly, after this point, the movable member 5 is to be rotated toward the folded position against the frictional resistance generated between the spherical bodies 8, 9 and the opposing surface 6b. The spherical body 8 is abutted against the second hitting portion 11b by the frictional resistance generated between the spherical body 8 and the opposing surface 6b.

When the spherical body 9 moves through the first contact point 14c toward the folded position to abut against the first cam portion 14a, the biasing force of the coiled spring 7 is converted into a third rotational biasing force by the spherical body 9 and the first cam portion 14a. The third rotational biasing force rotationally biases the movable member 5 in a direction from the talking position toward the folded position. Therefore, in this hinge assembly, the first cam portion 14a is used as the third cam portion. When the movable member 5 is rotated from a position in which the spherical body 9 is in abutment with the first contact point 14c through the distance d1 toward the folded position, the spherical body 8 is abutted against the first contact point 13c. When the movable member 5 is further rotated toward the folded position, the spherical body 8 is abutted against the first cam portion 13a. Consequently, the spherical body 8 is moved through the distance 2d1 by the first rotational biasing force to abut against the first hitting portion 11a. This generates a clicking sound. After the abutment of the spherical body 8 against the first hitting portion 11a, the movable member 5 is rotated through the distance d2 by the first rotational biasing force and the third rotational biasing force to reach the folded position, and maintained at the folded position. The movable member 5 is also inclined when the movable member 5 is at the folded position, when the spherical body 9 is in abutment with the first contact point 14c and the spherical body 8 is in abutment with the opposing surface 6b, and when the spherical body 9 is at a position away from the first contact point 14c by the distance d1 and the spherical body 8 is in abutment with the first contact point 13c. However, the amount of inclination is the same as or smaller than the amount of inclination when the movable member 5 is in the talking position.

In a case where the movable member 5 is moved from the folded position toward the talking position, when the movable member 5 has been moved through the distance (d1+d2), the spherical body 9 escapes the first cam portion 14a to be abutted against the opposing surface 6b. When the movable member 5 is further rotated through the distance d1, the spherical body 8 is abutted against the opposing surface 6b as well. After that, the movable member 5 reaches the talking position in the above-described manner.

Figure 15:
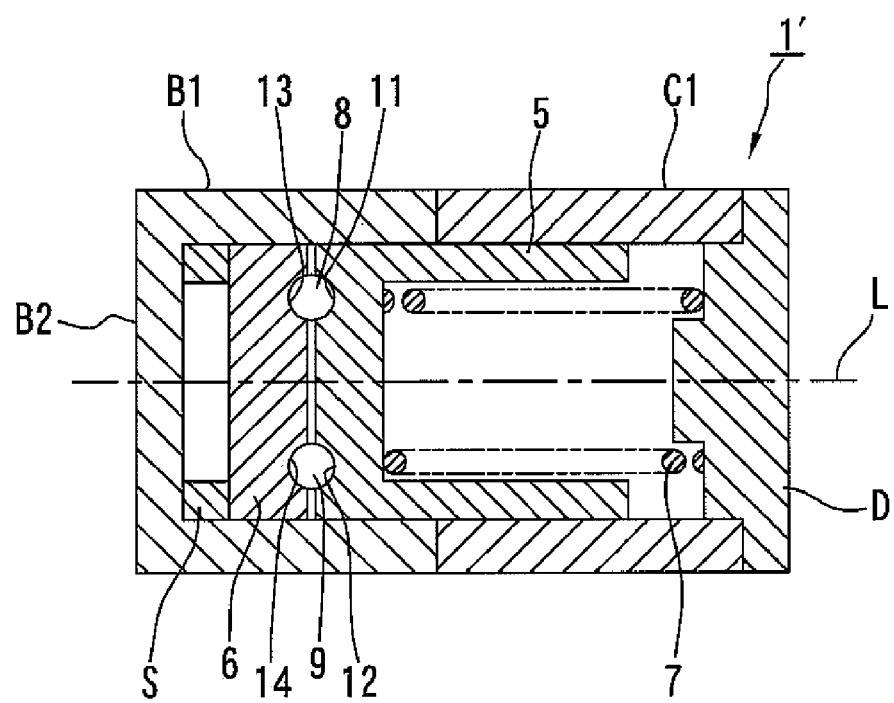
FIG. 15 is a cross-sectional view showing a third embodiment of the present invention.

FIG. 15 shows a third embodiment of the present invention. In a hinge assembly 1' of this embodiment, one end portion of the movable member 5 is non-rotatably fitted in the connection cylindrical part C1 of the reception section C and the other end portion of the movable member 5 (end portion nearer to the fixed member 6) is rotatably fitted in the connection cylindrical part B1 of the transmission section B. As a result, the connection cylindrical parts B1, C1 are rotatably connected about the rotation axis L. The fixed member 6 is non-rotatably fitted in the connection cylindrical part B1. Arranged as such, the first and second hinge members 2, 3, and the hinge pin 4 are not used in this embodiment. The fixed member 6 is rotatably connected to the movable member 5 through the connection cylindrical parts B1, C1. The fixed member 6 is in abutment with a bottom part B2 of the connection cylindrical part B1 via a spacer S. The coiled spring 7 is disposed between the movable member 5 and a lid body D disposed on the connection cylindrical part C1. Other arrangements are similar to the first embodiment.

The present invention is not limited to the above described embodiments and various modifications are possible within the scope of the present invention.

For example, while in the embodiments given above, the spherical bodies 8, 9 are disposed on the movable member 5 and the engagement recesses 13, 14 are formed in the fixed member 6, the engagement recesses 13, 14 may alternatively be formed in the movable member 5 and the spherical bodies 8, 9 may be provided on the fixed member 6.

Moreover, while in the embodiments given above, the receiving recesses 11, 12 are formed in the circular shape, the receiving recesses 11,12 may be formed in a shape of an oval elongated in the circumferential direction about the rotation axis L.

Furthermore, while in the embodiments given above, the first cam portions 13a, 14a and the second cam portions 13b, 14b are each formed with the convex circular arc surface that protrudes outwardly, the first and second cam portions may alternatively be formed with a flat surface in place of the circular arc surface.

INDUSTRIAL APPLICABILITY

A hinge assembly according to the present invention can be utilized as a hinge assembly for rotatably connecting a first housing and a second housing of a portable device such as a mobile phone handset or a portable game machine.

The invention claimed is:

1. A hinge assembly comprising:
a fixed member;
a movable member connected to said fixed member such that said movable member is rotatable about a rotation axis and movable toward and away from said fixed member along said rotation axis; and
biasing means biasing said movable member toward said fixed member,
one of opposing surfaces of said fixed member and said movable member facing each other having an abutment member disposed therein, said abutment member being abutted against the other of said opposing surfaces by said biasing means,
said the other of said opposing surfaces having a first cam portion disposed therein, said first cam portion converting a biasing force of said biasing means into a first rotational biasing force by being abutted against said abutment member, said movable member being rotationally biased in a first circumferential direction by said first rotational biasing force via said abutment member,
characterized in that said one of said opposing surfaces has a receiving recess formed therein;
that said abutment member is received in said receiving recess such that said abutment member is movable in a circumferential direction about said rotation axis within a predetermined range; and
that said receiving recess has a first hitting portion disposed in one end portion thereof in said first circumferential direction, said first hitting portion defining one of limit points of a movable range of said abutment member and generating a clicking sound by being abutted against said abutment member moved by said first rotational biasing force.

2. A hinge assembly according to claim 1, wherein two of said abutment members arranged symmetrically with respect to said rotation axis and two of said receiving recesses arranged symmetrically with respect to said rotation axis are provided and, correspondingly, two of said first cam portions are provided.

3. A hinge assembly according to claim 1, wherein said receiving recess has a second hitting portion disposed in the other end portion thereof in the circumferential direction about said rotation axis, said second hitting portion defining the other of said limit points of said movable range of said abutment member and generating a clicking sound by being abutted against said abutment member;
wherein said the other of said opposing surfaces has a second cam portion disposed therein, said second cam portion converting said biasing force of said biasing means into a second rotational biasing force by being abutted against said abutment member, said second rotational biasing force acting in the opposite direction from said first rotational biasing force; and wherein said abutment member is abutted against said second hitting portion by said second rotational biasing force.

4. A hinge assembly according to claim 3, wherein two of said abutment members arranged symmetrically with respect to said rotation axis and two of said receiving recesses arranged symmetrically with respect to said rotation axis are provided and, correspondingly, two of said first cam portions and two of said second cam portions are provided.

5. A hinge assembly comprising:

a fixed member;

a movable member connected to said fixed member such that said movable member is rotatable about a rotation axis and movable toward and away from said fixed member along said rotation axis; and biasing means biasing said movable member toward said fixed member, one of opposing surfaces of said fixed member and said movable member facing each other having an abutment member disposed therein, said abutment member being abutted against the other of said opposing surfaces by said biasing means, said the other of said opposing surfaces having a first cam portion disposed therein, said first cam portion converting a biasing force of said biasing means into a first rotational biasing force by being abutted against said abutment member, said movable member being rotationally biased in a first circumferential direction by said first rotational biasing force via said abutment member, characterized in that said one of said opposing surfaces has a receiving recess formed therein;

that said abutment member is received in said receiving recess such that said abutment member is movable in a circumferential direction about said rotation axis within a predetermined range; and that said receiving recess has a first hitting portion disposed in one end portion thereof in said first circumferential direction, said first hitting portion defining one of limit points of a movable range of said abutment member and generating a clicking sound by being abutted against said abutment member moved by said first rotational biasing force, wherein said one of said opposing surfaces has a projecting portion disposed fixedly thereon, said projecting portion projecting toward said the other of said opposing surfaces; and wherein said the other of said opposing surfaces has a first sub-cam portion disposed therein, said first sub-cam portion converting said biasing force of said biasing means into a rotational biasing force by being abutted against said projecting portion, said rotational biasing force cooperating with said first rotational biasing force to cause said movable member to be rotated in said first circumferential direction.

6. A hinge assembly according to claim 5, wherein said receiving recess has a second hitting portion disposed in the other end portion thereof in the circumferential direction about said rotation axis, said second hitting portion defining the other of said limit points of said movable range of said abutment member and generating a clicking sound by being abutted against said abutment member; and wherein said the other of said opposing surfaces has a second cam portion and a second sub-cam portion disposed therein, said second cam portion converting said biasing force of said biasing means into a second rotational biasing force by being abutted against said abutment member, said second rotational biasing force acting in the opposite direction from said first rotational biasing force, said second rotational biasing force causing said abutment member to be abutted against said second hitting portion, said second sub-cam portion converting said biasing force of said biasing means into a rotational biasing force by being abutted against said projecting portion, said rotational biasing force cooperating with said second rotational biasing force to cause said movable member to be rotated in said second circumferential direction.

* * * * *